United States Patent
Lai et al.

(10) Patent No.: US 8,652,613 B2
(45) Date of Patent: Feb. 18, 2014

(54) QUADRUPLE-WALL CORRUGATED PAPERBOARD AND METHOD OF MANUFACTURE

(75) Inventors: Sim Poh Lai, Penang (MY); Ting Kee Hoe, Penang (MY); Khor Chai Seang, Penang (MY); Melissa Tan Chea Ling, Penang (MY)

(73) Assignee: Master-Pack Sdn. Bhn., S.P.S. Penang (MY)

( * ) Notice: Subject to any disclaimer, the term of this patent is extended or adjusted under 35 U.S.C. 154(b) by 615 days.

(21) Appl. No.: 12/702,492

(22) Filed: Feb. 9, 2010

(65) Prior Publication Data

US 2011/0195231 A1   Aug. 11, 2011

(51) Int. Cl.
*B32B 3/28* (2006.01)
*B32B 7/02* (2006.01)
*B31F 1/20* (2006.01)

(52) U.S. Cl.
USPC ............ 428/184; 428/212; 428/219; 156/205

(58) Field of Classification Search
USPC .......... 428/34.2, 182, 184, 212, 219; 156/205
See application file for complete search history.

(56) References Cited

U.S. PATENT DOCUMENTS

| | | | | |
|---|---|---|---|---|
| 3,096,224 A | * | 7/1963 | Goldstein et al. | 428/186 |
| 3,293,107 A | * | 12/1966 | Wells et al. | 428/186 |
| 4,500,381 A | | 2/1985 | Nordstrom | |
| 4,647,063 A | * | 3/1987 | Piringer et al. | 280/610 |
| 5,433,156 A | | 7/1995 | Hutchison | |
| 5,681,641 A | * | 10/1997 | Grigsby et al. | 428/182 |

FOREIGN PATENT DOCUMENTS

| | | |
|---|---|---|
| DE | 9210636 | 12/1992 |
| DE | 10143633 A1 | 3/2003 |
| DE | 202006016773 U1 | 4/2008 |
| DE | 202008010831 U1 | 2/2010 |
| FR | 2652035 A1 | 3/1991 |
| FR | 2671184 A1 | 7/1992 |
| GB | 2012670 A | 8/1979 |
| JP | 2000272655 | 3/2000 |
| JP | 2006096009 | 4/2006 |
| WO | WO 98/18614 | 5/1998 |
| WO | WO 98/41392 | 9/1998 |

OTHER PUBLICATIONS

Hungarian Search Report from corresponding Singapore Application No. 2009067000, dated Jan. 15, 2010, 8 pages.

* cited by examiner

*Primary Examiner* — Donald J Loney
(74) *Attorney, Agent, or Firm* — Brinks Gilson & Lione

(57) ABSTRACT

A corrugated paperboard for the packaging industry comprising of five liners (1a, 1b, 1c, 1d, 1e) and four intermediate corrugating mediums (2a, 2b, 2c, 2d) with flute type combination of B-C-B-C; thereby providing robust, greater compression strength, yet capable of economically produce corrugated paperboard by utilizing the method of combining paperboard using corrugator to produce doublewall and sheet pasting machine to make the final combination of a quadruple-wall paperboard.

4 Claims, 3 Drawing Sheets

PRIOR ART

QUADRUPLE-WALL CORRUGATED PAPERBOARD AND METHOD OF MANUFACTURE

FIELD OF INVENTION

The invention associates mainly to packaging material, in particular it relates to the structure of corrugated paperboard.

BACKGROUND

With the present emphasis on sustainable resources that comes with low environmental impact, corrugated paperboard packaging, in particular using corrugated paperboard is receiving new attention and positive receptions due to its recyclability, relative low cost, good cushioning effects and light weight properties as compared to other packaging materials such as plastic foams, metal and wood containers. The capability of corrugated paperboard to package any tailor-made shapes, sizes and weight has expanded its possibilities to further limits. As a result, there is an increasing interest in utilizing it in protective packaging for various products, e.g. fragile goods such as fresh fruits and vegetables, consumer-packed manufactured products, precise equipments and instruments, industrial machineries, and household appliances, etc. The advantage of corrugated paperboard packaging is enhanced by having its suitability for all different modes of transport, e.g. land, shipping by sea, or by air.

Corrugated paperboard is an environmental-friendly packaging material. It is made of reusable paper and water-based glue, and these materials are recyclable, reusable and biodegradable. The paper based construction material comprises corrugated sandwich structure; a fluted corrugated sheet within several linerboards. The medium as shown in FIG. 1 is the corrugated or fluted paper glued between the linerboard facings. The corrugated paper between facings of corrugated paperboard is called fluting or corrugating medium. The best quality fluting is made from short hardwood fibers of deciduous trees by a special pulp cook method. Such fluting contains only a small percentage of clean, mill waste (kraft). A large part of the fluting mediums, on the other hand is manufactured mainly from waste paper. Flutes that anchored to linerboard with starch based adhesive will enable corrugated paperboard to resist bending and pressure from all directions. When pressured to the side of the board, the space between the flutes acts as a cushion to protect the packaging content. The flutes also serve as an insulator, providing some product protection from sudden temperature changes. Linerboard is the flat facing or liner that adheres to the medium. The outer and inner facings or liners of corrugated board are usually made from the long softwood fibers of coniferous trees which have the desired strength properties. Linerboards can also contain various amounts of recycled or waste paper fibers. Ultimately, vertical linerboard provides additional strength and protects the flutes from damage. Both linerboard and medium are traditionally referred to by their weight, gram per square meter ($g/m^2$).

At the moment, there are several types of combined boards. Firstly, the singleface corrugated paperboard, as shown in FIG. 2 comprises a single liner is applied to one face of corrugated medium, and it is widely utilized as padding or for cushioning. Singlewall, as shown in FIG. 3 comprises two sheets of linerboard, one glued to each side of a fluted medium and is also known as doubleface. Doubleface corrugated paperboards are suited as material for packaging boxes and shipping containers. Whereas, doublewall as shown in FIG. 4 is made up of three sheets of linerboards, with two interleaved and glued corrugated mediums. This grade of paperboard is used mainly for more robust, higher strength containers and for heavy applications, particularly in packaging for export. Triplewall as shown in FIG. 5 is being composed of four flat sheets of linerboard, with three interleaved and glued corrugated mediums. Only few manufacturers make this grade, which is suited for very heavy industrial applications such as semi-bulk commodity bins. Triplewall is recognized as the most layered-combined boards available in the market currently.

The machine used to make these combined paperboards is known as a corrugator. Conventionally, the corrugator is a huge machine that is about 91.44 meters long, 4.5 to 6.1 meters high and 3.7 meters wide. It costs millions of dollars whereby its functions include putting flutes in the medium, glues the medium into linerboard to produce combined boards of singleface as illustrated in FIG. 2, singlewall as illustrated in FIG. 3, doublewall as illustrated in FIG. 4 or triplewall as illustrated in FIG. 5. The combined boards can consist of any combination of liners grades and flute types, namely: A, B, C, E, F, G, K, S. Mill roll stands, or also known as roll stands, hold the giant rolls of linerboard and corrugating material in place. This continuous process begins with reels of linerboard and corrugating medium paper rolls being loaded onto the mill roll stand. As the first paper roll runs out, or as the order is completed, and a different basis weight, width and type must be put in place for the next order, the machine is slowed down and a splicer automatically connects the second paper roll.

The paper is first conditioned with heat and steam and fed between large corrugating rolls, a large cylinder with a corrugated profile which gives the paper its fluted shape in single facer. Starch is applied to the tips of the flutes on one side and the inner liner is glued to the fluting. The corrugating fluting medium with one liner attached to it, which is also known as single face web, travels along the machine towards the double backer where the single face web is bonded to the outer liner and forms the corrugated board. At this stage, different types of combined board, which comprises of continuous sheet as wide as the rolls of container board is traversed through heating or hotplate and cooling sections which ensures the glue bond is strong by gelling the glue and removing moisture. After the board emerges from the double backer it passes through a rotary shear, where it cuts across the whole width of the web. This is used to chop out damage lengths of board. At a slitter scorer machine, a set of rotary knives will slit the paperboard into required width. The scorer will make creasing line, a folding line of paperboard in the machine direction. The slitter knives also trim the outside edges of the paperboard. The board then passes into a numerical control (NC) cutter where the board is cut to the required length. The capability of the corrugator to produce different types of combined paperboards depends solely on only the number of single facer machine fixed on the corrugator. In the conventional corrugating process, there should preferably be one singlefacer machine with three sets of mill roll stands and splicers to produce singlewall paperboard, to produce doublewall paperboard, there should preferably two singlefacers with five sets of roll stands and splicers, for triplewall, there should preferably be three singlefacer machines with seven sets of roll stands and splicers. Most of the corrugator machines available in the market can produce up to doublewall only. There is rarely a corrugating plant that would produce triplewall as they are very expensive.

Unless there are large orders for triplewall using present day methods of production, it is not be feasible to invest millions more on the singlefacer machines, roll stands, splicers as well as the additional machine space in order to produce triplewall paperboards or anything thicker or more robust than them. However due to present day demands and standards within the paper packaging industry itself, there is now a greater need for an even stronger and more robust paperboard, coupled with need for an innovative, cheaper and more economical method of manufacturing multi-layered corrugated paperboard for heavy industrial packaging usage.

SUMMARY OF THE INVENTION

One of corrugated paperboard's most distinct benefits over other forms of packaging is its versatility, which allows paperboard to be custom made for a specific application. It is the purpose of the present invention to provide for an improved, more robust, lightweight, economical and environmental friendly, novel corrugated paperboard for the packaging industry which also enables a cheaper and more efficient method of manufacture.

The present invention relates to a corrugated paperboard for the packaging industry formed by five liners with weight range of 275 to 400 g/m$^2$ and four intermediate corrugating mediums with weight range of 170 to 200 g/m$^2$ glue together to form with flute type combination of B-C-B-C; and comprises thickness ranging from 15 mm to 18 mm thereby providing robust, greater compression strength, yet capable of economically produce corrugated paperboard by utilizing the method of combining paperboard using corrugator to produce doublewall and sheet pasting machine to make the final combination of a quadruple-wall paperboard.

In general, there are several performance criteria to be considered while designing a certain type of corrugated paperboard. These criteria include the properties and requirements of the product being packaged, the mode in which the package will be shipped and stored, and the functions the package may be asked to perform, the environment the package will encounter etc. By understanding the performance criteria required by customer allows design and qualification of the package to be simulated in laboratory environment. Stacking strength is one of the key requirements of most packages. Stacking strength is defined as the maximum compressive load a corrugated paperboard carton or container can bear over a given period of time and under certain environment condition without failing. The capability of corrugated paperboard carton or container to carry a top load is affected mainly by its structure, i.e. types of flute profiles and linerboards combination used, the environment it encounters, the ability of inner liner packages and the dividers to sustain the load. Crush resistance (compression strength) is related to stacking strength where it identifies corrugated box resistance to a uniformly applied external force. Compression strength of paperboard can be tested using edge crush test or box compression test if actual physical box are present. Edge crush test (ECT) is adopted as a primary factor in predicting the compression strength of a completed box. Edgewise compressive strength (ECT) of the corrugated paperboard is measured by identifying the force a sample of prescribed size, with fluting oriented vertically which it can withstand. Both stacking and compression strength depends on the strength measured by the Ring Crush Test (RCT) of both liners and medium. Combined paperboard with heavier liners, greater caliper flute structure and multiwall combination such as doublewall and triplewall as compared to singlewall will provide greater compression strength due to its enhanced higher RCT value and greater caliper. Weight of liner and the burst factor needs to be considered as it is the key contributors to tearing resistance and puncture resistance, which is a critical factor for transporting product.

According to National Motor Freight Classification (NMFC) Item 222 box requirements (transportation rules in US), boxes that consist of certain size and weight must comply with certain burst, puncture test or edge crush test requirement. Any of the tests conducted must be in accordance with Technical Association of Pulp and Paper Industry (TAPPI) official test method. Corrugated paperboard containers or cartons that conform to specifications of NMFC must bear a legible certificate of a box manufacturer on an outside surface, guaranteeing that boxes do so conform. The requirements of NMFC Item 222 for singlewall, doublewall and triplewall are shown in Table 1.

TABLE 1

Standard Requirement of NMFC Item 222 of Corrugated Paperboard

| Maximum Weight of Box and Contents (lbs) | Maximum outside dimensions, length, width and depth added (inches) | Minimum edge crush test (ECT) (lbs. per in width) |
| --- | --- | --- |
| Singlewall Corrugated Paperboard Boxes | | |
| 20 | 40 | 23 |
| 35 | 50 | 26 |
| 50 | 60 | 29 |
| 65 | 75 | 32 |
| 80 | 85 | 40 |
| 95 | 95 | 44 |
| 120 | 105 | 55 |
| Doublewall Corrugated Paperboard Boxes | | |
| 80 | 85 | 42 |
| 100 | 95 | 48 |
| 120 | 105 | 51 |
| 140 | 110 | 61 |
| 160 | 115 | 71 |
| 180 | 120 | 82 |
| Triplewall Corrugated Paperboard Boxes | | |
| 240 | 110 | 67 |
| 260 | 115 | 80 |
| 280 | 120 | 90 |
| 300 | 125 | 112 |
| Present invention Corrugated Paperboard Boxes | | |
| 1543 | 131 | 129 |

In addition to the general requirements of singlewall, doublewall and triplewall; the present invention specification is also included in Table 1 for comparison. The specification stated in the Table is the result of test conducted in independent laboratories of TüV PSB. From the requirements of singlewall, doublewall and triplewall edge crush test value, the performance of the present invention supersedes these three types of paperboards in terms of structural strength. In addition to ECT test stated in Table 1, several other tests are conducted on the present invention to evaluate its capability to withstand other types of handling risks. A physical prototype of the present invention is produced and developed into required container box. Products to be transported by the present invention are also placed into the container box and the whole container is sent for independent laboratory test in accordance to International Safe Transit Association (ISTA) 2B—combination test for packaged-product weighing over 68 kg. Four tests conducted on the present invention are static compression test, vibration test, horizontal impact test and vertical impact test. Purpose of static compression test is to determine if the packaging survives prolong stacking in the long term stacking condition. Static compression test on the present invention is done in one hour, using a constant load of 3946 kgf. Test results showed no sign of physical damage to the product inside the container. Vibration test is to determine if the product will survive and be damage-free from the vibration level expected during transportation. Frequency of vibration tested ranges from 1.0 Hz to 200.0 Hz, power spectrum density 0.001 $g^2$/Hz, overall level of 1.15 grms for duration of one hour. Tests show that the present invention passed the vibration imposed on the container box. Horizontal impact test evaluates the ability of the bulk packed product to withstand sudden horizontal shocks due to handling and transportation.

Tests conducted on the present invention uses impact velocity of 69 in/sec or 6.31 km/hr. Results shows no damage to present invention. Vertical Impact test or also known as drop test is to evaluate the ability of bulk-packed product to withstand sudden shocks due to mechanical handling within the distributed system. Once drop test is conducted, container box is opened and product inside the container box is inspected. No visible damage can be observed from the drop test. Overall results of tests demonstrates the applicability of the present invention as a heavy and yet also a fragile-objects packaging material.

DESCRIPTION OF THE PREFERRED EMBODIMENT

Figure 1:
FIG. 1 is a cross-section view of corrugated flutes
Figure 2:
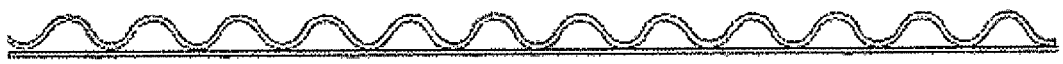
FIG. 2 is a cross-section view of single facer corrugated board having preferred flutes.
Figure 3:
FIG. 3 is a cross-section view of singlewall corrugated board having preferred flutes.
Figure 4:
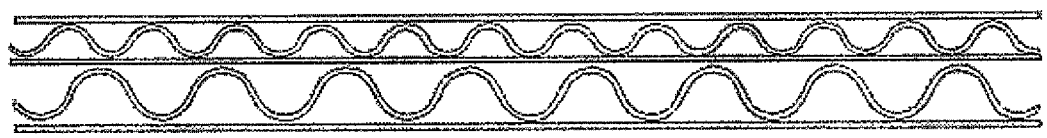
FIG. 4 is a cross-section view of doublewall corrugated board having two different flutings and three layers of liners.
Figure 5:
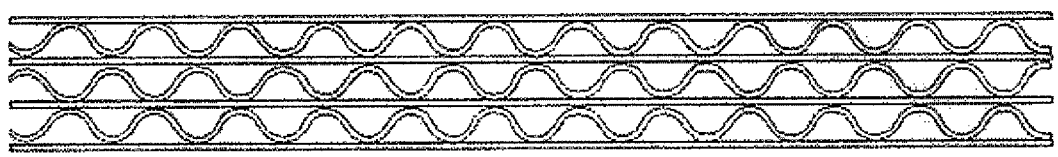
FIG. 5 is a cross-section view of triplewall corrugated board having three flutings and four layers of liners
Figure 6:
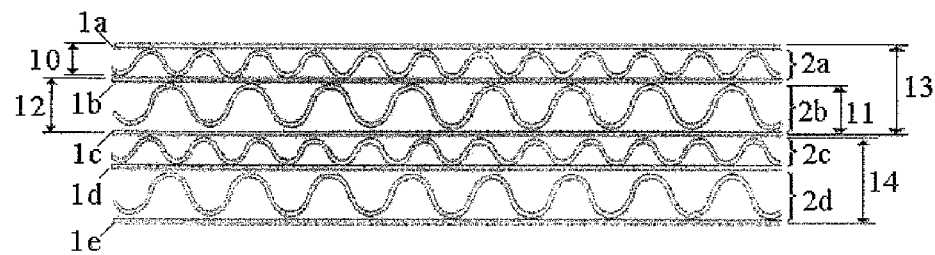
FIG. 6 is a cross-section view of the present invention with combined fluting arrangement of doublewall.

Referring to FIG. 6 the present invention is a corrugated paperboard formed by five liners (1a, 1b, 1c, 1d, 1e) and four intermediate corrugating mediums (2a, 2b, 2c, 2d). As in this embodiment, heavier liner (1a, 1b, 1c, 1d, 1e) weight range from 275 g/m$^2$ to 400 g/m$^2$ and medium (2a, 2b, 2c, 2d) weight range from 170 g/m$^2$ to 200 g/m$^2$ is adopted. Combination of large corrugating medium (2b, 2d), C-flute and small fluting corrugating medium (2a, 2c), B-flute is used. C-flute corrugating medium (2b, 2d), is adopted to maintain better vertical compression strength and cushioning capability while B-flute corrugating medium (2a, 2c), is used for enhancing the paperboard structure.

Figure 8:
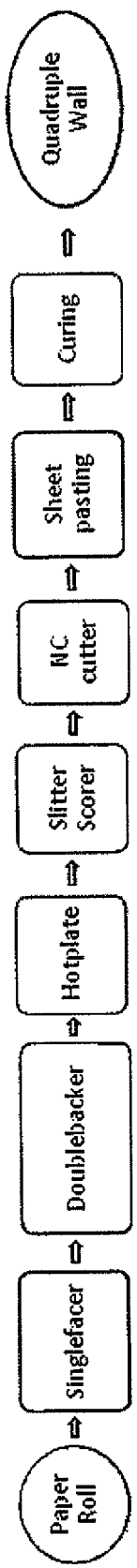
FIG. 8 is a manufacturing process flow chart of the present invention

The corrugating process of the present invention as shown in FIG. 8, corrugating medium (2a, 2b, 2c, 2d) is the part to which the glue is applied. Liners (1a, 1b, 1c, 1d, 1e) are required only to accept the adhesion with the medium (2a, 2b, 2c, 2d). The corrugating process begins as corrugating medium (2a), having thickness range from 0.25 mm to 0.30 mm inclusive is heated and moisturized to soften it. The medium (2a) passes over a steam-filled drum called (a) pre-heater and steam shower. The fibers in the medium (2a) become soft and bendable due to the heat and moisture. Medium (2a) is then fed between the nip of two long metal rolls with alternating ridges and grooves shaped like the flutes. The grooves mesh together like gears, forming the flutes in between them. Due to its wavy shape, it takes 148 lineal meter of flat paper to make 100 meter of C-flute corrugating medium (2b, 2d) and 136 lineal meter of flat paper to make 100 meter of B-flute corrugating medium (2a, 2c). The exact amount depends on the flute profile.

Liners (1a), having the thickness range from 0.45 mm to 0.51 mm inclusive are preheated to prepare them for bonding and to balance the moisture content between the two. Starch-based adhesive is applied to the peaks on one side of the corrugated medium (2a). Sodium hydroxide and borax are used to improve adhesive properties, improve shear stability of glue viscosity and to prevent early bacterial contamination. As the fluted medium (2a) exits the nip of the corrugating rolls, the flute tips pass through a film of adhesive carried on an applicator roll. Each flute picks up a narrow bead of adhesive. Pressure rolls locked the bond between liner (1a) and glue corrugated medium (2a) that form single face board (10). Pressure and heat applied by the pressure rolls gelatinizes the glue and holds the bond until it is dried. Another separate set of single facer roll repeats the process to form a separate sheet of single face board (11). One of the single face boards (11) is joined with the second liner (1b) with thickness range of 45 mm to 0.51 mm inclusive, to form singlewall (12). Both single face boards (10, 11) are then joined to become doublewall (13) as the double backer (4) applies glue to the exposed flute tips on the single face board (10, 12). Paperboard passes through hotplate (5) to remove excess moisture from board, finish drying up the glue as well as to help set the starch based glue. Once it is dried, paperboard is cut into preferred width (6) and cut into sheets (7). The sheets are stacked and accumulated in a stack at the end before it is transferred to sheet pasting process (8).

A piece of doublewall paperboard (13) having thickness range of 6.93 mm to 9.91 mm inclusive is feed into sheet pasting machine between two parallel rotating rollers with inner liner (1c) facing downward. Distance of top and bottom parallel rotating rollers is vertically adjustable to accommodate various thickness of paperboard ranging from 1.09 mm to 19.81 mm inclusive. Once the paperboard (13) is feed into the roller, the rollers pull the paperboard ahead and passes through a film of adhesive carried on by bottom glue applicator roller. While glue is applied on the inner liner (1c), top back-up roller leveler holds and applies pressure to the top surface of paperboard so that glue is evenly applied at the bottom of paperboard. The second roller at the bottom of the sheet pasting machine is doctor roll, which control the glue film on the applicator roll to laminate the paperboard (13). A separate double facer paperboard (14) with thickness range preferably from 1.09 mm to 19.81 mm inclusive is joined with glue applied paperboard (13) to form the finished product of the present invention as shown in FIG. 6. Minor readjustment is made to ensure both paperboards (13, 14) are glued aligned. The finished product of the present invention with the thickness of 15 mm to 18 mm inclusive is cured (9) for several hours depending on the adhesive substance used.

Figure 7:
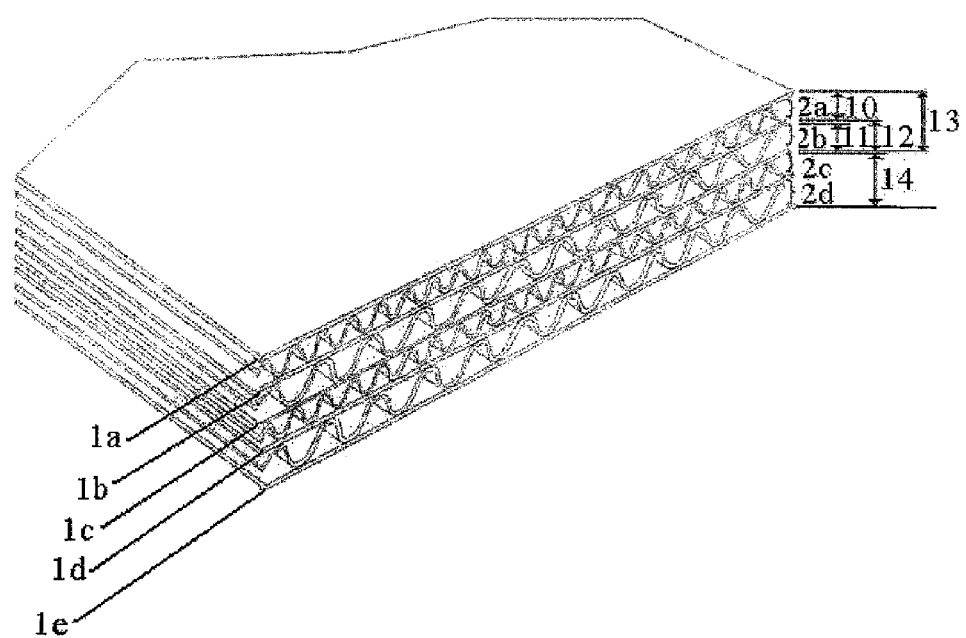
FIG. 7 is a perspective detail view of the present invention.

To meet modern demands and requirements of packaging applications, there is a greater need for such robust, yet lightweight, economical and environmental friendly solution to the presently available corrugated paperboards in use. Millions of dollars will need to be invested if present invention, which is shown in perspective detail view in FIG. 7, were to be produced using conventional corrugating process. In such an instance, it would probably have required at least four single facers machine with nine sets of roll stands and splicers have to be in place to produce five layers of liner and four layers of fluting. Therefore, this explains why there have been till now no successful attempts to make quadruple-wall paperboard as it would not be cost effective to do so. However, by using the innovative method of the present invention which is by combining paperboard (13, 14) using a corrugator and sheet pasting machine, it is now able to successfully produce quadruple wall without having to invest in four singlefacer machine with nine sets of roll stands and splicers. The present invention has made it possible to produce quadruple-wall economically without compromising the strength of paperboard, as shown in the test result herein.

Thus, the present invention has been described herein with reference to a particular embodiment for a particular application. Those having ordinary skill in the art and access to the present teachings will recognize additional modifications, applications and embodiments within the scope hereof. It is therefore intended by the appended claims to cover any or all such applications, modifications and embodiments within the scope of the present invention

The invention claimed is:

1. A corrugated paperboard for the packaging industry characterized in that it comprises five liners and four intermediate corrugating mediums wherein they are glued together to form a quadruple-wall paperboard, with a single liner between adjacent ones of the corrugating mediums, wherein the liners have a weight range of 275 to 400 g/m$^2$ and the corrugating mediums have a weight range of 170 to 200 g/m$^2$.

2. A corrugated paperboard for the packaging industry as claimed in claim 1 wherein the liners and the corrugating mediums of final combined corrugated paperboard comprises a thickness ranging from 15 mm to 18 mm inclusive.

3. A corrugated paperboard for the packaging industry as claimed in claim 1 wherein the liners and the corrugating mediums are arranged in a flute types combination of B-C-B-C.

4. A method of manufacturing a corrugated paperboard for the packaging industry characterized by combining paperboard using corrugator to produce doublewall and sheet pasting machine to make the final combination of quadruple-wall paperboard which is formed by five liners and four intermediate corrugated mediums glued together and arranged in B-C-B-C fluting combination of a quadruple-wall paperboard wherein a single liner is provided between adjacent ones of the corrugating mediums, and the liners have a weight range of 275 to 400 g/m$^2$ and the corrugating mediums have a weight range of 170 to 200 g/m$^2$.

* * * * *

UNITED STATES PATENT AND TRADEMARK OFFICE
CERTIFICATE OF CORRECTION

| | | |
|---|---|---|
| PATENT NO. | : 8,652,613 B2 | Page 1 of 1 |
| APPLICATION NO. | : 12/702492 | |
| DATED | : February 18, 2014 | |
| INVENTOR(S) | : Sim Poh Lai et al. | |

It is certified that error appears in the above-identified patent and that said Letters Patent is hereby corrected as shown below:

Title Page, item (73),

<u>Assignee</u>

The spelling of Assignee name "Master-Pack Sdn. Bhn.," should be corrected to --Master-Pack Sdn. Bhd.,--.

Signed and Sealed this
Twentieth Day of January, 2015

Michelle K. Lee
*Deputy Director of the United States Patent and Trademark Office*